Sept. 15, 1959     F. M. TEIXEIRA     2,904,196
LOADING AND UNLOADING APPARATUS FOR VEHICLES
Filed July 16, 1957     2 Sheets-Sheet 1
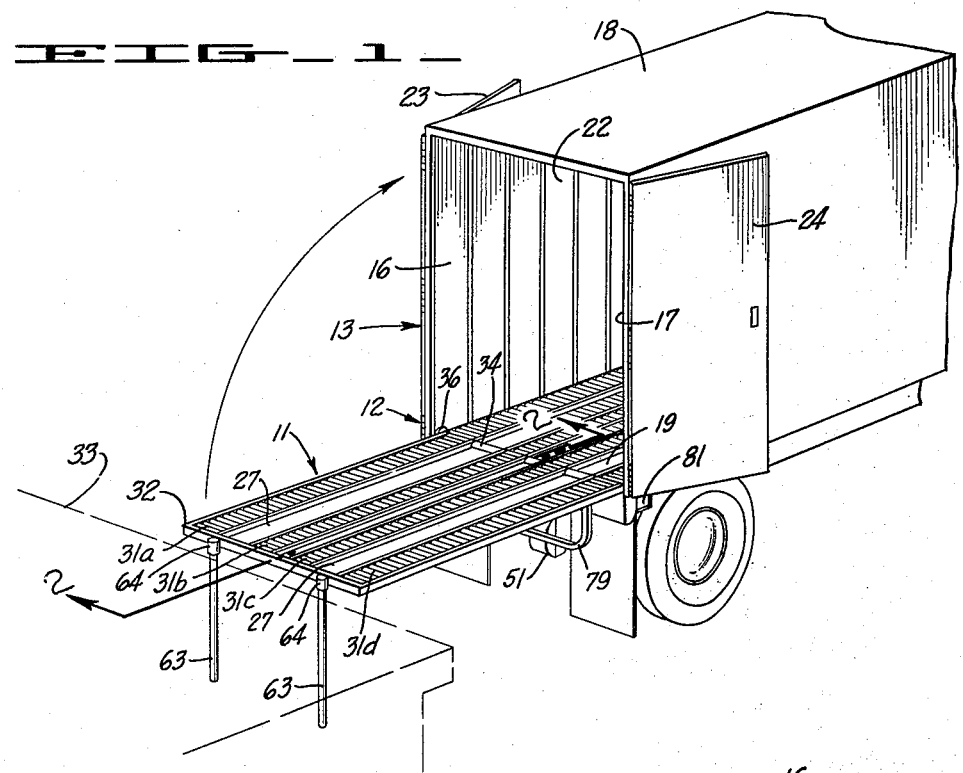
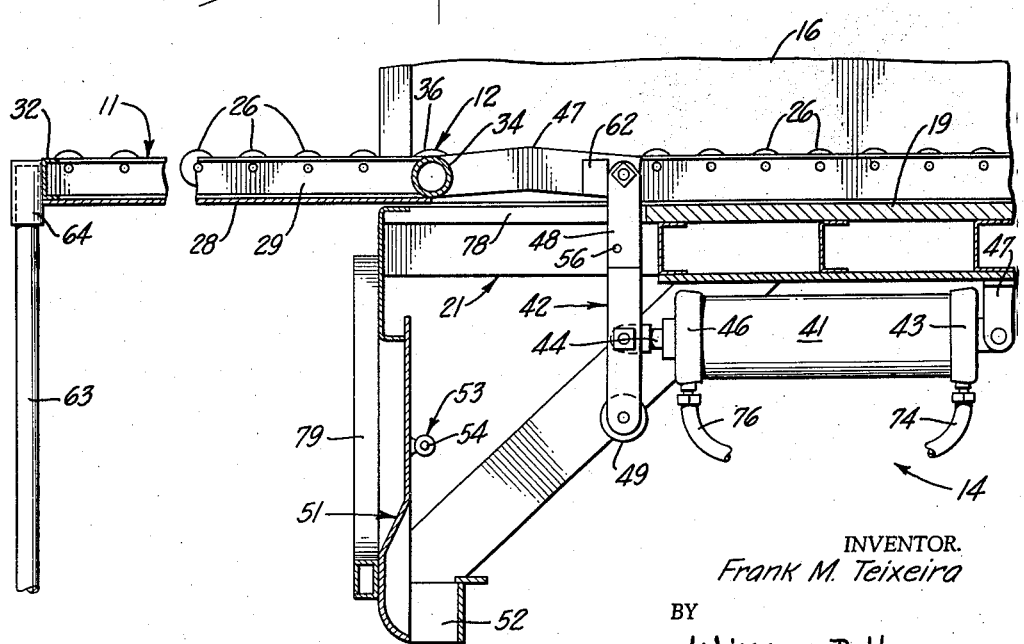
INVENTOR.
Frank M. Teixeira
BY
William D. Hager
ATTORNEY.

Sept. 15, 1959  F. M. TEIXEIRA  2,904,196
LOADING AND UNLOADING APPARATUS FOR VEHICLES
Filed July 16, 1957  2 Sheets-Sheet 2
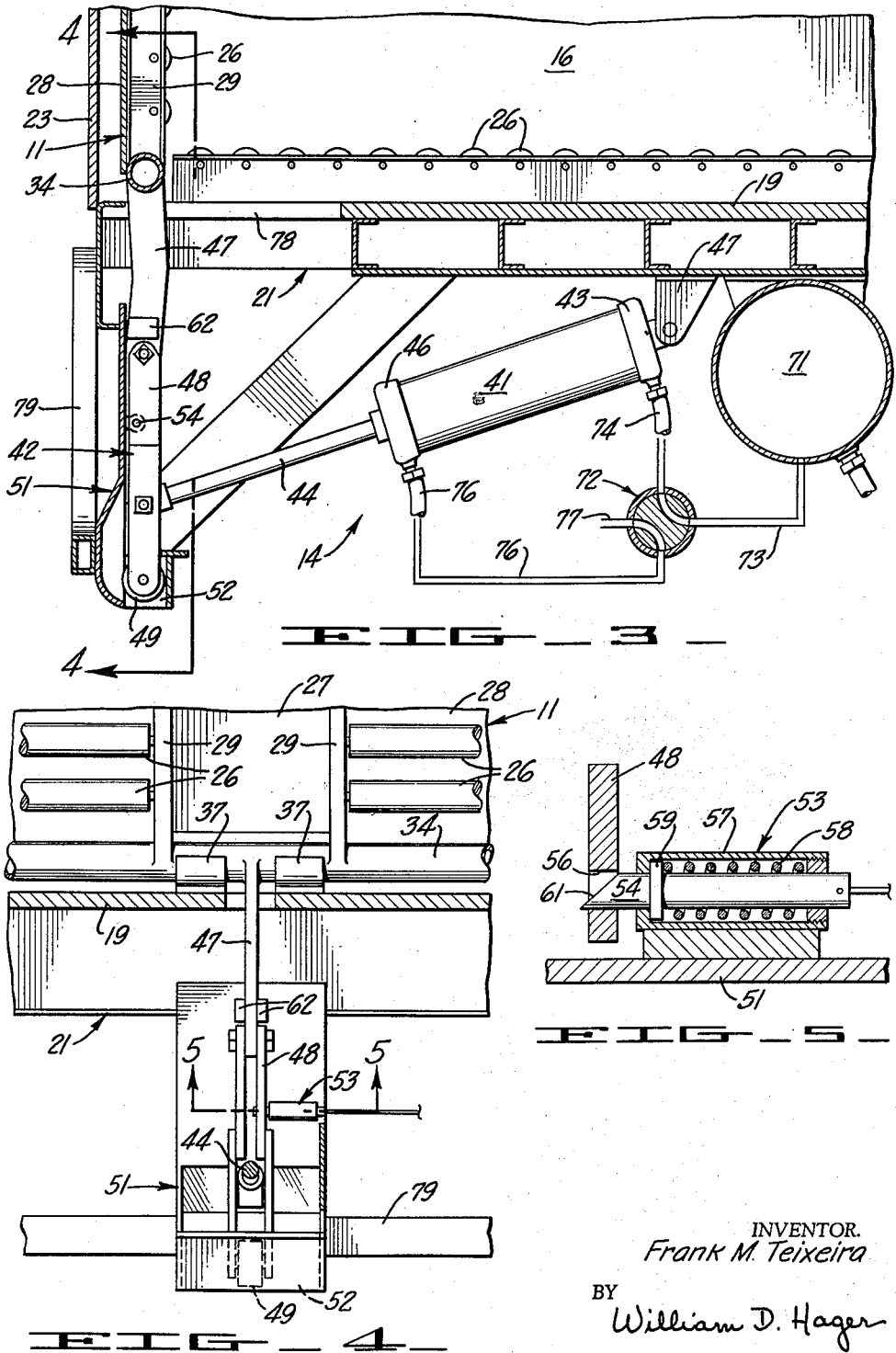
INVENTOR.
Frank M. Teixeira
BY William D. Hager
ATTORNEY.

United States Patent Office 2,904,196
Patented Sept. 15, 1959

2,904,196

LOADING AND UNLOADING APPARATUS FOR VEHICLES

Frank M. Teixeira, San Leandro, Calif.

Application July 16, 1957, Serial No. 672,304

2 Claims. (Cl. 214—84)

The invention relates to devices for facilitating the loading and unloading of vehicles and, more particularly, to unloading ramps which are carried with the vehicle from place to place.

In the loading and unloading of various vehicles such as trucks, trailers, freight cars, ships and cargo planes, significant amounts of time and labor may be saved by the use of a loading ramp carried on the vehicle itself. Numerous attempts have been made to provide such structures. These have proven generally unsuccessful in practice because of the difficulties of manually manipulating the various parts, and the unsatisfactory design of the ramp itself. Unloading devices of this class fall into two general categories, e.g. ramps over which the cargo may be carried or transported by handtrucks, and conveyors of either the powered or gravity type.

The present invention contemplates a loading and unloading apparatus which incorporates the best features of both ramps and conveyor, and which requires no manual effort in setting up. Other advantageous features include minimal occupancy of valuable cargo space space and light weight though sturdy construction. It is therefore an object of the present invention to provide a loading and unloading apparatus of the nature set forth which may be quickly and easily positioned for use and which may be as quickly and easily returned to a stored position taking up very little space.

Another object of the present invention is to provide, in an apparatus of the character described, a combined ramp-conveyor structure which will permit carrying, trucking or conveying of the cargo onto or from the vehicle in the manner best suited to the physical characteristics of the cargo.

A further object of the present invention is the provision of a light weight and sturdy loading and unloading apparatus which is carried on the vehicle in a position in which it is hidden from view, and yet occupies little cargo space, while at the same time serving to reinforce the door structure of the vehicle.

A still further object of the present invention is to provide an apparatus of the character described which may be power operated from a source of compressed air such as is commonly carried by vehicles having air brakes.

Yet another object of the present invention is to the provision of an apparatus of the character described in the form of an attachment which may be applied to existing vehicles with a minimum of structural changes therein.

Other objects and features of advantage will become apparent from a consideration of the following description and of the accompanying drawings forming a part of this specification.

With reference to said drawings:

Figure 1 is a perspective view of a loading and unloading apparatus constructed in accordance with the present invention and shown in unloading position in association with a truck-trailer.

Figure 2 is an enlarged sectional view taken substantially on the plane of line 2—2 of Figure 1.

Figure 3 is a sectional view taken similarly to that of Figure 2 but illustrating the parts in an inoperative or stored position assumed during transit.

Figure 4 is a sectional view taken substantially on the plane of line 4—4 of Figure 3.

Figure 5 is a fragmentary enlarged section taken substantially on the plane of line 5—5 of Figure 4.

The loading and unloading apparatus of the present invention, as illustrated in the drawings, consists basically of a loading ramp 11, mounting means 12 hingedly connecting the ramp 11 to the vehicle 13 for swinging movement between an upright position and a horizontally extending unloading position, and power means 14 on the vehicle connected to the ramp 11 for effecting such swinging movement. The apparatus may be employed to advantage with any of a wide variety of vehicles, but is particularly suited for use with highway transport trucks or trailers of the type shown in Figure 1 of the drawings. The vehicle 13 is here of closed body construction and includes vertical sidewalls 16 and 17, roof 18, and a floor 19 supported on a chassis 21. The entire rear end is unobstructed to provide an ingress and egress opening 22 which may be closed off while the vehicle is in transit by swinging doors 23 and 24 hinged to the sidewalls 16 and 17 at the side edges of opening 22. Preferably, the ramp 11 is proportioned to substantially fill the opening 22 when in upright position. This affords a reinforcement for the doors 23 and 24, or in certain instances the ramp 11 may be used in place of the doors.

In accordance with the present invention, the ramp 11 is constructed to provide features of both a plain ramp and a conveyor device. This is accomplished by mounting a plurality of parallel, freely rotatable rollers 26 on the face of the ramp which is uppermost when the ramp is in unloading position. The rollers 26 are aligned in a plurality of rows which are arranged to leave walkways 27 therebetween. As illustrated in Figures 1 through 4 of the drawings, the ramp 11 preferably consists of a solid plate 28, of the desired length and width, upon which are secured channel members 29 which serve to support the rollers 26 in four rows 31a, 31b, 31c and 31d, the space between the rows being left clear to provide the walkways 27. While the ramp 11 may be made of any suitable material, it has been found that the use of aluminum plate, channels and rollers will result in a structure which is economically desirable because it is light in weight and not subject to corrosion. The bracing effect of the channels 29 imparts rigidity to the structure without excessive weight. Preferably, similar rows of rollers 26 are provided on the floor 19 of the vehicle to facilitate movement of cargo onto and off of the ramp.

The mounting means 12 supports the ramp 11 for swinging movement between a horizontally extending unloading position, shown in Figures 1 and 2, to an upright position in the opening 22, as illustrated in Figure 3. The ramp 11, preferably, is generally horizontal in the unloading position, although it is noted that it may be tilted somewhat so that its outer end 32 can coincide with the floor level of the unloading dock 33 (depicted in phantom lines in Figure 1). As is best shown in Figures 2, 3 and 4 of the drawings, a tube 34 is mounted across the inner end of the ramp 11, to serve as a shaft about which the ramp can swing, the tube 34 being journaled at its end in bearings 36 and supported at its middle by half bearings 37, thus providing a hinged connection of the ramp to the vehicle body.

In order to provide for swinging of the ramp 11 between its upright and unloading position with a minimum of manual effort and in a rapid and safe manner, the means 14 should be relatively powerful. At the same time, the power means 14 should not occupy or block valuable cargo space. For these reasons, and because many vehicles carry a compressed air system for braking, a pneumatically operated power means is particularly desirable. Preferably, and as here shown, this means includes a pneumatic cylinder 41 mounted at the underside of the vehicle chassis 21 and connected by a suitable linkage assembly 42 to the ramp 11. As illustrated in the drawings, the cylinder 41 is of the two-way type, that is air under pressure may be admitted to the rear end 43 of the cylinder to drive the reciprocative member 44 outwardly, or alternatively the air may be admitted to the forward end 46 to retract the member 44. The cylinder 41 is arranged under the vehicle floor 19 with its rear end 43 pivotally supported by a bracket 47 secured to the chassis, and the member 44 is pivotally connected to the linkage assembly 42, see Figures 2 and 3.

The linkage assembly 42 is designed to translate the reciprocative motion of the pneumatic cylinder 41 into swinging motion of the ramp 11. This assembly here consists of a lever arm 47 secured to and extending from the tube 34, and a bifurcate link member 48 having one end pivoted to the distal end of lever arm 47. A roller 49 is journaled in the opposite end of link member 48, and the pivotal connection of the cylinder member 44 to the linkage assembly is located in the link member intermediate its length. A guideway 51 is attached to the chassis 21 in position to engage and guide the roller 49 during the swinging movement of the ramp 11. The parts are formed and proportioned so that, when the ramp 11 is in upright position as shown in Figure 3, the lever arm 47 and link member 48 will extend downwardly in a substantially vertical plane with the roller 49 retained against horizontal movement in a cup 52 formed at the lower end of the guideway. Further movement of the ramp 11 into the interior of the vehicle body is prevented by the lever arm 47 striking the guideway, and the ramp is held from movement in the opposite direction by the force exerted by the air cylinder. For times when the air supply is not available to hold the ramp, a safety lock 53 is mounted on the guideway 51 and provided with a latch tongue 54 engageable in an opening 56 in the link member 48. As may best be seen in Figure 5 of the drawings, the safety lock 53 includes a cylindrical housing 57 in which is mounted a coil spring 58 compressed between the housing and a shoulder 59 on the latch tongue 54 and acting to keep the tongue extended. A bevel 61 is formed on latch tongue 54 in position for engagement by the link member 48 as it swings into upright position so as to retract the tongue and allow it to snap into opening 56 when the ramp is completely upright.

When it is desired to lower the ramp 11, air is admitted by cylinder end 46 causing the member 44 to retract. This pulls the link member 48 away from the guideway 51. Since the lower end roller 49 is confined in the cup 52, the link member tends to pivot around the roller, pulling the upper end of the link member and the attached lever arm in a manner causing the ramp 11 to swing outwardly and downwardly. As this action proceeds, the roller rides up the guideway until the relative folding action between the lever arm 47 and link member 48 is halted by a stop 62 on the lever arm. This takes place when the lever arm and link member are at about 90° displacement. Continued retraction of member 44 will then move the parts to the position shown in Figure 2 when the ramp 11 will be in approximately a horizontal position. If desired, the outer end 32 of the ramp may be supported on the loading dock, etc. or a pair of legs 63, removably fitting into inverted sockets 64 on the ramp end 32, may be provided.

In accordance with the present invention, the pneumatic cylinder 41 may be powered by compressed air from a compressor unit or from the braking system of the vehicle 13. As here shown, the vehicle is provided with a compressed air storage tank 71 having a capacity making it suitable for use as a source of compressed air for actuating the cylinder 41. A suitable valve means for controlling the actuation of the cylinder is indicated diagrammatically in Figure 3 and includes a two way valve 72 connected to the tank 71 by conduit 73 and to the opposite ends 43 and 46 of the cylinder by conduits 74 and 76. Rotation of the valve 72 to the position shown in Figure 3 will connect the supply conduit 73 to the cylinder rear end 43 through conduit hose 74 causing the previously described swinging of the ramp 11 to upright position. In this position of the valve 72, the conduit 76 leading to the front end 46 of the cylinder will be vented to the atmosphere through a stub conduit 77. By merely rotating the valve 72 counterclockwise 90°, conduit 76 will be connected to supply conduit 73 and conduit 74 vented to atmosphere. This will cause the member 44 to retract into the cylinder 41 and thus lower the ramp to its unloading position.

From the foregoing description it will be seen that the loading and unloading apparatus for vehicles, of the present invention, provides a powered ramp structure combining advantages of ramp and conveyor in a novel manner resulting in a strong, sturdy and compact assembly. In this connection it is noted that the present apparatus is particularly adaptable to mounting on existing vehicles. For example, most trucks and truck trailers have a clear area at the center of the rear overhang of the vehicle body sufficient to accommodate the pneumatic cylinder 41 in the manner shown in the drawings. A short, narrow slot 78 may be cut in the floor for the lever arm 47 and the guideway 51 mounted on the existing rear guard 79 of the vehicle. Connection of the cylinder 41 to the existing air reservoir 71 is by means of flexible hoses 73, 74 and 76. Preferably, the control valve 72 is located within easy reach of an operator such as at station 81 depicted in Figure 1.

While the salient features of this invention have been described in detail with respect to certain embodiments thereof, it will of course be apparent that certain modifications may be made within the spirit and scope of this invention, and it is not desired therefore to limit the invention to the exact details shown except insofar as they may be defined in the following claims.

What is claimed is:

1. In a loading and unloading apparatus for a cargo carrying vehicle, which vehicle is of the class characterized by a cargo enclosure having an extensive opening in one wall thereof, the combination comprising a ramp member having a first edge pivotally attached to said enclosure at the lower margin of said opening therein whereby said ramp member is swingable between a horizontal position and an upright position, a plurality of parallel rollers mounted on the upper face of said ramp member which rollers are arranged in a plurality of spaced apart columns thereby providing for walkways upon said ramp member, a lever arm projecting from said first edge of said ramp member in the plane of said ramp member, a rigid elongate link having a first and pivotally attached to the distal end of said lever arm, a pneumatic cylinder secured to said vehicle and having a controllably reciprocable shaft pivotally connected with a central portion of said link, a roller wheel mounted on the distal end of said link, and a fixed vertical guideway secured to said vehicle and projecting downwardly from said lower margin of said opening, said guideway lying in the plane defined by said lever arm and said link and providing a bearing surface against which said roller bears upon extension of said pneumatic cylinder whereby said link and said lever arm are constrained to pivot said ramp member upward.

2. A loading and unloading apparatus for a cargo carrying vehicle substantially as described in claim 1 wherein said guideway is provided with an upwardly opening cup member secured to said bearing surface at the point of maximum downward travel of said roller wheel therealong, said cup member having an internal diameter sufficient to receive said roller wheel whereby the lower end of said link is prevented from moving laterally at the start of contraction of said pneumatic cylinder and proper flexing of the pivot joint between said link and said lever arm is assured.

References Cited in the file of this patent

UNITED STATES PATENTS

| | | |
|---|---|---|
| 2,459,045 | Pride | Jan. 11, 1949 |
| 2,676,720 | Noble | Apr. 27, 1954 |

FOREIGN PATENTS

| | | |
|---|---|---|
| 483,326 | Great Britain | Apr. 19, 1938 |